(No Model.)
E. LAWSON.
VEHICLE WHEEL.
No. 280,634. Patented July 3, 1883.
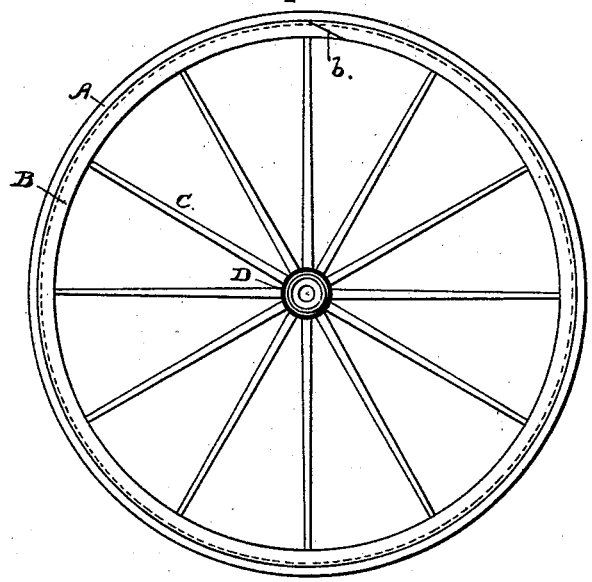
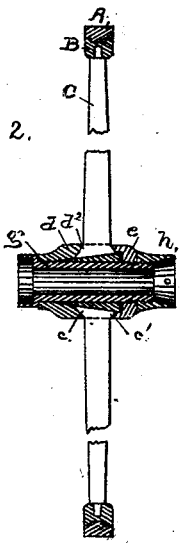
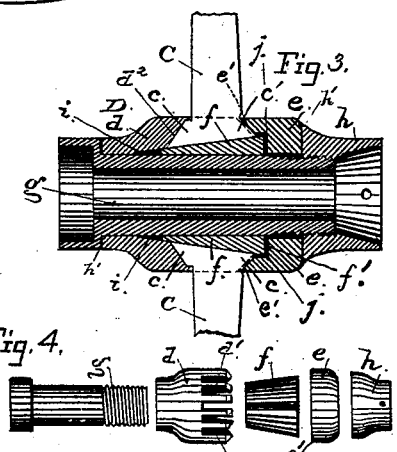
Witnesses:
S. A. Dickson
F. M. Downey
Inventor:
Enoch Lawson
By his Atty., Edward E. Osborn

UNITED STATES PATENT OFFICE.

ENOCH LAWSON, OF SAN FRANCISCO, CALIFORNIA.

VEHICLE-WHEEL.

SPECIFICATION forming part of Letters Patent No. 280,634, dated July 3, 1883.

Application filed February 17, 1883. (No model.)

*To all whom it may concern:*

Be it known that I, ENOCH LAWSON, a citizen of the United States, residing in the city and county of San Francisco, State of California, have made and invented new and useful Improvements in Vehicle-Wheels; and I do hereby declare that the following is a full, clear, and exact description of my said invention, reference being had to the accompanying drawings, which form a part of this specification.

My invention relates to improvements in vehicle-wheels made wholly of metal; and it includes a novel construction of felly in one piece, and an improved mode of applying and fixing the tire thereto; also, an improvement in fastenings or devices for securing and locking the spokes in place.

The following description fully explains the nature of my said invention, and the manner in which I proceed to construct, apply, and use the same, the accompanying drawings being referred to by figures and letters, as follows:

Figure 1 is a general view of my improved wheel in elevation. Fig. 2 is a cross-section taken through the wheel at about Fig. 1. Fig. 3 is a section taken through the hub and the fastening parts. Fig. 4 illustrates the several parts constituting the lock and fastening for the ends of the spokes. Fig. 5 is a cross-section through the tire and felly at one of the spokes. These last three views are on a larger scale.

A is the tire, B the felly, and C C the spokes. D is the hub, of which $d\ e\ f$ constitute the locking device; $g$, the axle-box, and $h$ the screw-threaded cap or hollow nut to force and hold the parts together on the box $g$.

The felly is a single piece of metal, rolled or otherwise formed and brought into shape. The two ends are brought together and joined by a lap or scarf joint, $b$, and at this point a socket for the shouldered end of a spoke is placed, so that the joint is then directly over the spoke. The outer face of this continuous felly is channeled or grooved to receive a rib of corresponding shape provided on the inner face or circumference of the tire. The tire is made continuous or of the usual form, and the felly is placed inside and easily sprung into place before the spokes are inserted. Thus it will be seen that no bolts, clips, screws, or other fastenings are employed to join the tire and felly nor the spokes and felly.

The improvement in fixing and locking the spokes in place consists in forming or providing the inner ends or butts of the spokes with wedge-shaped and outwardly-setting shoulders $c\ c'$, and then forming the hub D in two parts, one of which is provided with radial slots $d'\ d'$, having undercut ends $d^2$, while the other part, $e$, is a cup-shaped cap or cylinder with a projecting rim, $e'$, having an inclined face. This collar is slipped on the axle-box $g$ after the spokes are set in the slots, and then, being pressed up against the part $d$ of the hub, the inwardly-inclined face or edge of the collar takes over the shoulder $c'$ upon a spoke, and by its pressure and position keeps the other shoulder, $c$, in place under the undercut edge at the end of the slot. This forms a secure and positive fastening when the cap or nut $h$ is screwed on the end of the axle-box. The inner end of the box has a shoulder, $h'$, that forms a stop for the end of the socketed hub $d$, and the one screw cap or nut binds the parts firmly together.

To force out the spokes and hold their shouldered ends in place against the felly, I form a tapering chamber, $i$, in the slotted part $d$ of the hub, and insert a conical sleeve, $f$, to pass under the ends of the spokes that project through the hub-slots inside. These ends of the spokes are finished off with an inclined face of the same inclination as the face of the conical sleeve $f$, so that by pressing the sleeve back into the chamber $i$ of the hub an outward pressure is brought and maintained against the ends of the spokes. The collar $e$ has a shoulder, $f'$, inside, to bear against the head of this wedge-shaped sleeve, so that the screw cap or nut is caused to press the sleeve back into place at the same time that the parts $d\ e$ are pressed and bound together. Washers $j$ are interposed between the end of the sleeve and the shoulder of the collar $e$ if it be required to increase the pressure against the ends of the spokes.

In this manner I construct a strong, light, and durable wheel without bolts, screws, or other imperfect fastenings. The tire, spokes, and other parts are readily replaced when worn or broken, and all loose play and rattling are overcome.

Having thus fully described my invention, what I claim, and desire to secure by Letters Patent, is—

1. A vehicle-wheel having a tire with an inward projection, as shown, and a felly formed of one piece, with a groove for the reception of the projection on the tire, the ends of which felly are held by a lap or scarf joint, with a spoke inserted at the joint, and without other holding means, substantially as set forth.

2. A vehicle-wheel consisting of the tire A, the continuous or single-piece felly B, having its joint held by the outward pressure of a spoke, the axle-box $g$, hub $d$, with undercut seats at the end of its slots, the collar $e$, with inclined face or edge, the spokes with shouldered ends $c\,c'$, and the binding screw-thread cap or nut, all substantially as herein described, to operate as set forth.

3. In combination with the axle-box $g$, the hub $d$, having radial slots or sockets with undercut faces to receive and take over the shouldered ends of the spokes, the collar $e$, with its inclined inner surface, and the screw cap or nut, substantially as hereinbefore described, to operate as set forth.

4. In combination with the spokes C, having the wedge-shaped or inclined shouldered ends, as described, the axle-box $g$, slotted hub $d$, with undercut faces and taper bore or chamber, the conical sleeve $f$, collar $e$, with inclined face $e'$, and the screw cap or nut, substantially as described, to operate as set forth.

ENOCH LAWSON. [L. S.]

Witnesses:
EDWARD E. OSBORN,
F. M. DOWNEY.